No. 820,840. PATENTED MAY 15, 1906.
I. O. WRIGHT & J. H. FARLOW.
DRAFT AND BUFFING GEAR FOR CARS.
APPLICATION FILED MAR. 22, 1905.
2 SHEETS—SHEET 1.
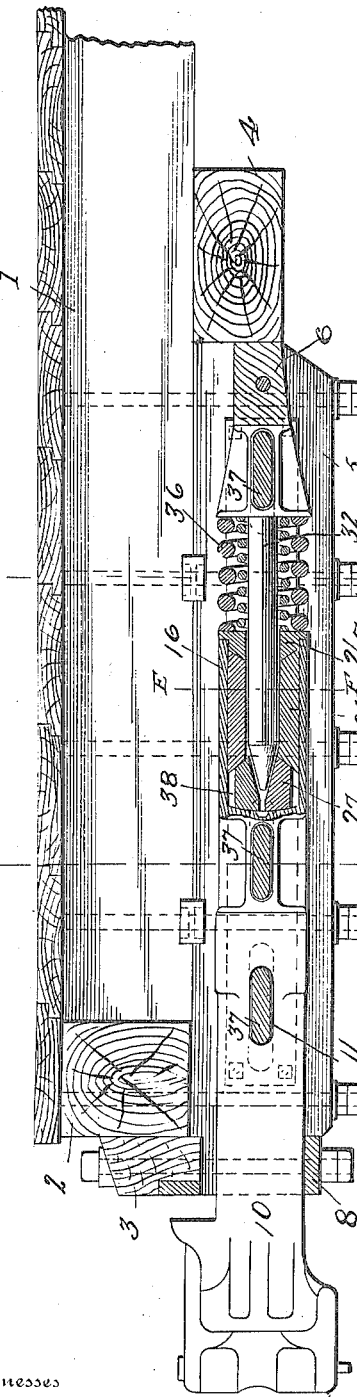
Witnesses
Chas. K. Davies.
Robert W. Geib.
Inventors
I. O. Wright,
J. H. Farlow,
J. E. Stebbins,
Attorney No. 820,840. PATENTED MAY 15, 1906.
I. O. WRIGHT & J. H. FARLOW.
DRAFT AND BUFFING GEAR FOR CARS.
APPLICATION FILED MAR. 22, 1905.
2 SHEETS—SHEET 2.
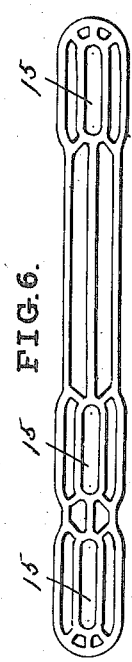
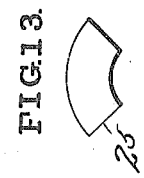
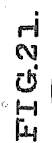
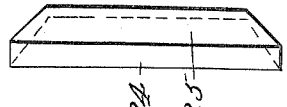
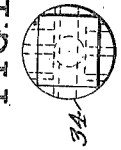
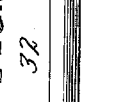
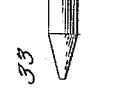
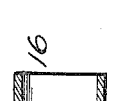
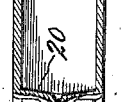
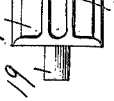
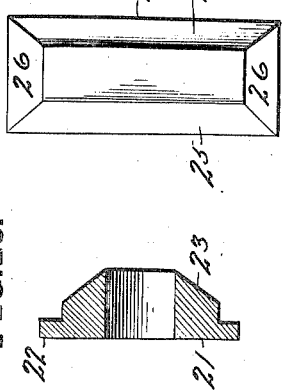
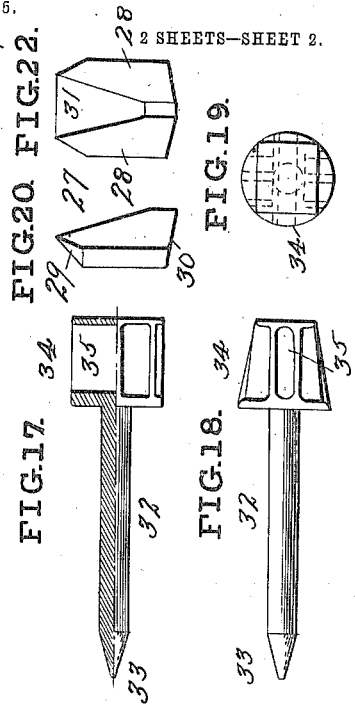
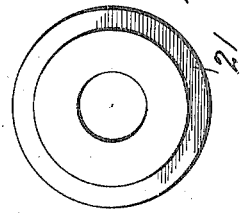
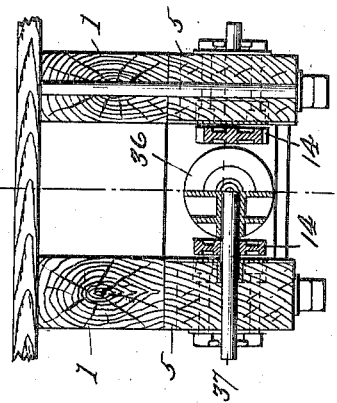
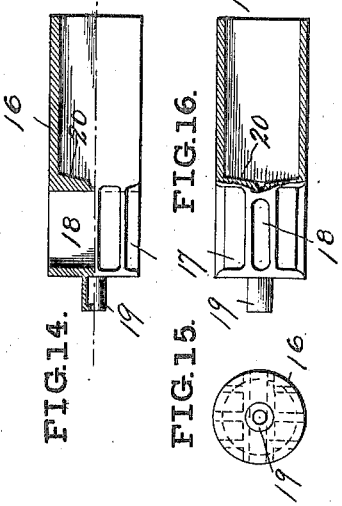
Witnesses
Chas. K. Davies.
Robert U. Geib.
Inventors
I. O. Wright.
J. H. Farlow.
By F. E. Stebbins.
Attorney

UNITED STATES PATENT OFFICE.

IRA ORVILLE WRIGHT AND JOHN HANCOCK FARLOW, OF BALTIMORE, MARYLAND, ASSIGNORS TO FARLOW DRAFT GEAR COMPANY, OF BALTIMORE, MARYLAND.

DRAFT AND BUFFING GEAR FOR CARS.

No. 820,840.   Specification of Letters Patent.   Patented May 15, 1906.

Application filed March 22, 1905. Serial No. 251,525.

*To all whom it may concern:*

Be it known that we, IRA ORVILLE WRIGHT and JOHN HANCOCK FARLOW, citizens of the United States, residing at Baltimore city, State of Maryland, have invented new and useful Improvements in Draft and Buffing Gears for Cars, of which the following is a specification.

The object of our invention is the improvement of the draft and buffing gear or rigging patented to us on September 22, 1903, No. 739,770, by the introduction of certain modifications in construction and the incorporation of frictional devices for absorbing the strains and shock of severe service, thus increasing the efficiency and effectiveness of the gear to perform the requisite functions.

With these main ends in view our invention consists in certain novelties of construction and the arrangement and combinations of parts hereinafter set forth and claimed.

The accompanying drawings illustrate an example of the physical embodiment of our invention or improvements constructed according to the best of several modes we have so far devised for the practical application of the principle.

Figure 1 is a vertical sectional view in elevation, taken on the dotted line in Fig. 2, the draw-bar being in elevation. Fig. 2 is a half top plan and half horizontal sectional view on the line of the draw-bar, the floor of the car being removed. Fig. 3 is a longitudinal sectional view of one of the cheek-plates. Fig. 4 is a face view of a cheek-plate. Fig. 5 is a half cross-sectional view on line A B of Fig. 1 and a half cross-sectional view on line C D of the same figure. Figs. 6 and 7 are face and edge views of a draft-link. Fig. 8 is a section on line E F of Fig. 1. Figs. 9 and 10 are views of the cylinder-head. Figs. 11, 12, and 13 are views of one of the four friction-blocks. Figs. 14, 15, and 16 show the friction-cylinder. Figs. 17, 18, and 19 are views of the friction-piston. Figs. 20, 21, and 22 are views of one of the friction-wedges.

Referring to the several figures, the numeral 1 designates one of the center sills of the car-frame; 2, the end sill; 3, the buffer-block; 4, the body-bolster; 5, the draft sills or timbers; 6, a filler-block bolted to the draft-sills and bearing against the body-bolster; 7, bolts which secure the draft-timbers to the center sills; 8, the carry-iron for the coupler; 9, three elongated slots in the draft-sills; 10, the coupler and draw-bar; 11, a horizontal hole or passage in the draw-bar shank; 12, the two cheek-plates countersunk in the draft-timbers; 13, slots in the cheek-plates corresponding to the slots in the draft-sills; 14, the two draft-links; 15, slots in the links, the front and middle slots being elongated; 16, the friction-cylinder, having one end open; 17, the solid end of the cylinder, constituting a front follower; 18, a hole through the front follower or solid portion of the friction-cylinder; 19, a pin or lug of the front follower seated in the end of the draw-bar; 20, the beveled wall at the inner closed end of the cylinder; 21, the cylinder-head; 22, a circular flange which normally bears against the circular edge of the cylinder end; 23, the beveled face of the cylinder-head; 24, one of the four friction-blocks, each being concavo-convex in cross-section and having longitudinally-beveled edges, so that when the four blocks are assembled they form a cylindrically-shaped block in cross-section; 25, the beveled edges; 26, the beveled ends of the friction-blocks, each beveled surface at one end bearing against the beveled face 23 of the cylinder-head; 27, one of the four friction-wedges, which when assembled form a body cylindrical in cross-section; 28, the beveled sides of a wedge; 29, the beveled front ends of the wedges which bear against the beveled ends of the friction-blocks; 30, the beveled rear ends of the wedges, which frictionally engage the beveled wall 20 of the friction-cylinder; 31, the beveled surfaces, which when the wedges are assembled form a conical-shaped recess; 32, the friction-piston; 33, the conical end of the piston frictionally engaging the surfaces of the conical-shaped recess formed by the friction-wedges; 34, the head of the piston or rear follower, to which the piston is attached; 35, a hole or passage through the head or follower; 36, a spring supported by the piston and bearing at one end against the piston-head and at the other end against the cylinder-head, and 37 designates the three keys which are passed through the holes in the draw-bar, friction-cylinder head, the piston head or follower, the draft-links, and the slots in the draft-timbers.

The relative location of the several parts and elements when assembled is clearly shown by Figs. 1 and 2 of the drawings. The front key is at the middle of the slots in the draft-sills, the middle key at the front portion of the slots, and the rear key at the rear portion of the slots in which it is located. The friction-blocks have their convex surfaces in contact with the inner surface of the cylinder, and there is a space 38 exterior of the friction-wedges within the cylinder.

The *modus operandi* is as follows: When the coupler and draw-bar are advanced in towing or pulling, motion is imparted to the rear key through the medium of the links, the middle key remaining stationary and holding the friction-cylinder immovable. Simultaneously the spring is compressed and the conical point of the piston moved along the surface 31 of the friction-wedges, which latter are forced apart and travel up the frictional surfaces 26 and wall 20 and move the friction-blocks rearwardly in frictional contact with the inner surface of the cylinder, which movement also causes the cylinder-head to leave its seat and compress the spring or springs. It is obvious that as the piston advances thirty frictional surfaces are brought into engagement and that the movement of sixteen of said surfaces over the other sixteen surfaces held in close contact by the springs performs a very large amount of "work" and prevents the strains and shocks from being transmitted to the draft-timbers and car-underframe. When the front and rear keys reach the ends of the slots in the draft-timbers, all strains and shocks not absorbed by the springs and frictional elements are transmitted to the draft-timbers at a plurality of points in each and not concentrated at one point.

In buffing, the action of the springs and frictional elements is identical with their action in drawing. However, the front and middle keys and the cylinder move rearwardly in buffing, and the head of the piston or follower transmits some strain to the filler-block against which it bears. The keys when they reach the ends of the slots in the draft-timbers distribute the shocks at a plurality of points, as in the act of drawing.

From the foregoing description, taken in connection with the drawings, it becomes clear that we have produced a very efficient gear for absorbing the strains and shocks of severe service.

In the practical application of the principles involved many changes and modifications may be introduced without constituting substantial departures.

Other frictional devices may be substituted for those shown and located between the followers or combined with a spring or springs and perform the functions in whole or in part of our device, parts be transposed, and the relative movement of parts altered, and modification, when used in connection with the keys, links, and slotted supports illustrated or their equivalents, we intend to embrace within the scope of the claims. Our gear may also be applied to cars having deep metallic center sills with slots for the keys, and the term "slotted supports" is intended to include such sills and other arrangements which permit the same or an analogous mode of operation as herein set forth.

What we claim is—

1. The combination in a draft and buffing gear, of a coupler and draw-bar; a front follower; a rear follower; a friction device between the followers; links; keys; and slotted supports for the keys, the key supporting the front follower being movable within slots of the supports.

2. The combination in a draft and buffing gear, of a coupler and draw-bar; a front follower; a rear follower; a friction device and spring or springs between the followers; links; keys; and slotted supports for the keys, the key supporting the front follower being movable in slots in the supports.

3. The combination in a draft and buffing gear, of a coupler and draw-bar; a front follower; a rear follower; a friction device between the followers; slotted links; keys; and slotted supports for the keys; all of the keys being movable within the slots of the supports, and the friction device supported by the keys.

4. The combination in a draft and buffing gear, of a coupler and draw-bar; a front follower; a rear follower; a friction device and spring or springs between the followers; slotted links; keys; and slotted supports; all of the keys being movable within the slots of the supports, and the friction device and spring or springs supported by the keys.

5. The combination in a draft and buffing gear, of a coupler and draw-bar; a front follower; a rear follower; a friction device and spring or springs between the followers; links; keys; and slotted supports for the keys; said friction device consisting of a cylinder, a piston, a cylinder-head and movable friction-blocks and friction-wedges.

6. A friction device for draft and buffing gears, embracing a cylinder, a cylinder-head, a piston, a plurality of friction-blocks and a plurality of friction-wedges within the cylinder, and a spring or springs; the wedges adapted to move radially and the blocks longitudinally when the piston engages the wedges.

7. A friction device for draft and buffing gears, embracing a cylinder, a cylinder-head, a piston, a plurality of friction-blocks arranged to form a cylindrical body with a passage for the piston, a plurality of friction-wedges arranged to form a conical seat for the end of the piston, and a spring.

8. The combination in a friction device, of a slotted follower carrying a cylinder, a slotted follower carrying a piston, movable friction-blocks within the cylinder, and a spring or springs; said follower being carried by keys located within slotted supports.

9. The combination in a friction device for draft and buffing gear, of a follower with a cylinder at one end, a follower with a piston at one end, frictional elements between the piston and cylinder, and a spring or springs; the said followers being held in place by keys movable within slotted supports of the gear.

10. The combination with a draft and buffing gear, provided with slotted supports and constructed substantially as described, of a front follower with a passage therethrough, a rear follower with a passage, keys within the passages of the followers and slots of the supports, a friction device between the followers; slotted links; and a coupler and draw-bar; the front follower-block and key which passes through the same being movable.

11. The combination with a draft and buffing gear provided with slotted supports, of a front follower with a passage therethrough, a rear follower with a passage, keys within the passages of the followers and slots of the supports, a friction device, a spring, slotted links, and a coupler and draw-bar; the said friction device and spring being located in direct line between the follower-blocks.

12. The combination in a draft and buffing gear, of a coupler and draw-bar; a front follower; a rear follower; a friction device between the followers; links; slotted supports; and keys passed through the draw-bar, followers, and links and movable within the slotted supports; the arrangement being such that in drawing the rear follower and draw-bar move forwardly, and in buffing the draw-bar and front follower move rearwardly.

13. The combination in a draft and buffing gear, of a coupler and draw-bar; a front follower; a rear follower; a friction device between the followers; slotted links; keys; and slotted supports for the keys; all of the keys being movable within the slots of the supports.

14. The combination in a draft and buffing gear, of a coupler and draw-bar; a front follower; a rear follower; a friction device between the followers; slotted links; keys; and slotted supports; the links in drawing being movable relative to or over one of the keys, which key in buffing is movable within slots of the supports.

15. The combination in a draft and buffing gear, of a coupler and draw-bar; a front follower; a rear follower; a friction device and a spring or springs arranged in line with and between the followers; slotted supports; three keys within the slotted supports; and two slotted links located between the friction device and the slotted supports and suppported by the keys; the friction element and the spring or springs being brought into action simultaneously in both buffing and drawing.

16. The combination with a draft and buffing gear provided with slotted supports, and constructed substantially as set forth, of a front follower with a passage therethrough, a rear follower with a passage, slotted links, keys within the passages of the followers and slots of the links and supports, a coupler and draw-bar, and a friction device and spring in connection with the followers; both the front follower-block and the key which passes through the same being movable.

In testimony whereof we affix our signatures in presence of two witnesses.

IRA ORVILLE WRIGHT.
JOHN HANCOCK FARLOW.

Witnesses:
   THOS. KELL BRADFORD,
   FRED J. HESS.